United States Patent
Narahara et al.

(10) Patent No.: US 8,888,157 B2
(45) Date of Patent: Nov. 18, 2014

(54) REAR VEHICLE-BODY STRUCTURE OF VEHICLE

(71) Applicant: Mazda Motor Corporation, Hiroshima (JP)

(72) Inventors: Takashi Narahara, Hiroshima (JP); Kiyoshi Hayashi, Hatsukaishi (JP); Hayato Miyazaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/953,507

(22) Filed: Jul. 29, 2013

(65) Prior Publication Data

US 2014/0054928 A1 Feb. 27, 2014

(30) Foreign Application Priority Data

Aug. 21, 2012 (JP) ................... 2012-182048

(51) Int. Cl.
| | |
|---|---|
| *B60R 13/01* | (2006.01) |
| *B60R 13/02* | (2006.01) |
| *B62D 43/10* | (2006.01) |
| *B62D 25/20* | (2006.01) |
| *B62D 25/08* | (2006.01) |

(52) U.S. Cl.
CPC ............ *B62D 25/2027* (2013.01); *B62D 43/10* (2013.01); *B62D 25/087* (2013.01)
USPC ...................... 296/1.08; 296/193.08; 296/39.1

(58) Field of Classification Search
CPC ...... B60R 13/01; B60R 13/011; B60R 13/02; B60R 13/068
USPC ........ 296/1.08, 193.08, 203.04, 146.8, 146.9, 296/56, 76, 39.1, 191, 187.11
See application file for complete search history.

(56) References Cited

U.S. PATENT DOCUMENTS

| | | | | |
|---|---|---|---|---|
| 3,933,385 | A * | 1/1976 | Sanford et al. | 293/136 |
| 5,346,275 | A * | 9/1994 | Enning et al. | 296/187.11 |
| 6,318,782 | B1 * | 11/2001 | Suzuki et al. | 296/37.1 |
| 6,846,037 | B2 * | 1/2005 | Engels et al. | 296/193.04 |
| 7,347,475 | B2 * | 3/2008 | Ikemoto et al. | 296/37.16 |
| 7,766,406 | B2 * | 8/2010 | Galicia et al. | 296/1.09 |
| 8,132,847 | B2 * | 3/2012 | Kimura et al. | 296/146.9 |
| 8,469,439 | B2 * | 6/2013 | Kishino | 296/146.9 |

(Continued)

FOREIGN PATENT DOCUMENTS

JP 11-170925 A 6/1999

*Primary Examiner* — Gregory Blankenship
(74) *Attorney, Agent, or Firm* — Studebaker & Brackett PC (57) ABSTRACT

A floor panel, a rear end member which is provided at a rear portion of the floor panel and extends in a vehicle width direction, and a rear end trim which covers a surface on a baggage-compartment side of the rear end member are provided. A step portion is formed at a connection portion connecting an upper portion of the rear end member and a lower portion of the rear end member which is positioned in front of and below the upper portion. An opening is formed at the step portion. An attachment portion, by which the rear end trim is attachable to the rear end member, is provided at the rear end trim. This attachment portion is configured to be inserted from above into the opening for engagement.

5 Claims, 5 Drawing Sheets

(56) References Cited

U.S. PATENT DOCUMENTS

| | | | |
|---|---|---|---|
| 8,668,253 B2* | 3/2014 | Bauer | 296/199 |
| 2004/0066061 A1* | 4/2004 | Engels et al. | 296/193.08 |
| 2008/0277968 A1* | 11/2008 | Egawa et al. | 296/193.08 |
| 2010/0123329 A1* | 5/2010 | Galicia et al. | 296/39.1 |
| 2011/0101736 A1* | 5/2011 | Sogame | 296/203.04 |
| 2013/0001986 A1* | 1/2013 | Takenaka | 296/193.08 |
| 2013/0241240 A1* | 9/2013 | Tokumoto et al. | 296/193.08 |
| 2014/0054928 A1* | 2/2014 | Narahara et al. | 296/193.08 |

* cited by examiner

REAR VEHICLE-BODY STRUCTURE OF VEHICLE

BACKGROUND OF THE INVENTION

The present invention relates to a rear vehicle-body structure of a vehicle equipped with a rear end trim, in particular, to a rear vehicle-body structure of a vehicle, in which a rear end member has at a middle portion thereof an opening which opens upward for engagement with a rear end trim.

Conventionally, a rear end portion of a vehicle comprises a rear end panel forming a rear wall and a rear end member forming a closed cross section cooperatively with the rear end panel. A synthetic-resin-made rear end trim is provided to cover a surface of a front side of the rear end member in order to improve appearances and values of goods and restrain damages of articles loaded in a baggage compartment.

According to a tail end member trim structure of an automotive vehicle disclosed in Japanese Patent Laid-Open Publication No. 11-170925, a rear end member has a hole which longitudinally penetrates a front vertical wall portion thereof, and a tail end member trim (a rear end trim) is attachable to the rear end member by a clip to be inserted into the hole for engagement.

Developments of improving aerodynamic characteristics of a vehicle have been recently conducted to improve the fuel economy (gas mileage) and the like. In the event of traveling air flowing down below a vehicle body hitting against a spare tire pan, the flow of the traveling air is disturbed so that the traveling resistance of the vehicle may improperly increase, thereby deteriorating the fuel economy. Therefore, it is known to decrease the amount of downward projection of the spare tire pan in order to improve the fuel economy. Herein, the smaller the amount of downward projection of the spare tire pan is, the larger the amount of upward projection, i.e., toward the inside of the baggage compartment, of a spare tire stored in the spare tire pan is. Therefore, a loading space of the articles in the baggage compartment may improperly decrease, thereby deteriorating the space efficiency of the baggage compartment.

In general, since the spare tire pan is arranged close to the rear end member forming an edge portion of an opening portion of the baggage compartment in order to allow a passenger to easily take out a spare tire of the spare tire pan, the distance between the rear end member and the spare tire pan is set to be as small as possible. Therefore, in a case in which the spare tire projects greatly toward the inside of the baggage compartment, the spare tire is arranged such that it is close to and faces to the opening of the rear end member for attaching the rear end trim. In the tail end member trim structure of an automotive vehicle disclosed in the above-described patent document, since the clip is inserted into the opening of the rear end member longitudinally from the front to the rear, some space for moving (attaching) the rear end trim in this direction may be required to be formed in front of the rear end member.

Further, in a case in which the rear end trim formed integrally with an engaging hook is attached, the rear end trim is fixed to the rear end member by moving the rear end trim in a curve shape from obliquely-forward above to obliquely-downward below relative to the opening of the rear end member, thereby inserting the above-described hook into the opening of the rear end member. That is, in the case of the rear vehicle-body structure with the spare tire projecting greatly toward the inside of the baggage compartment, the opening of the rear end member and the spare tire are arranged such that these two are close to each other and face to each other. Accordingly, there is a concern that the spare tire may improperly block an area in front of the opening of the rear end member, so that any sufficient space for moving the rear end trim longitudinally may not be ensured, like the above-described structure disclosed in the patent document.

Herein, it may be considered that the spare tire pane is located at a forward position in the baggage compartment to ensure the above-described sufficient space. In this case, however, an easy operation of the passenger for taking out the spare tire may be deteriorated. Moreover, since not only the spare tire but also other articles, such as a jack, are loaded in the baggage compartment of the vehicle in many cases, there is a concern that even in a case in which the above-described articles are loaded in front of and close to the rear end member, the above-described problem of the space for attaching the rear end trim may occur.

SUMMARY OF THE INVENTION

Accordingly, an object of the present invention is to provide a rear vehicle-body structure of a vehicle which can effectively fix the rear end trim to the rear end member, without receiving any improper influence of articles loaded in front of the rear end member in the baggage compartment.

According to the present invention, there is provided a rear vehicle-body structure of a vehicle, comprising a floor panel, a rear end member provided at a rear portion of the floor panel and extending in a vehicle width direction, and a rear end trim covering a surface on a baggage-compartment side of the rear end member, wherein a loading space of baggage is formed in front of the rear end trim, the rear end member has an opening which opens upward at a middle portion thereof, and the rear end trim has an attachment portion, by which the rear end trim is attachable to the rear end member, the attachment portion being configured to be inserted from above into the opening of the rear end member for engagement between the attachment portion and the opening.

According to the present invention, since the opening which opens upward is formed at the middle portion of the rear end member, even in a case in which any article, such as a spare tire or jack, is loaded in front of and close to the rear end member, there exists no obstacle (no article loaded in the baggage compartment) above the above-described opening which may hinder the attaching of the rear end trim. Accordingly, the space for attaching the rear end trim can be ensured properly above the rear end member. Thus, since the space for attaching the rear end trim is ensured above the rear end member and also the attachment portion configured to be inserted into the opening of the rear end member is provided at the rear end trim, the rear end trim can be effectively fixed to the rear end member from right above vertically, without receiving any improper influence of articles loaded in front of the rear end member in the baggage compartment.

According to an embodiment of the present invention, the rear end member has a step portion which is formed at a connection portion connecting an upper portion of the rear end member and a lower portion of the rear end member which is positioned in front of and below the upper portion, and the opening is formed at the step portion. Thereby, the opening which opens upward can be formed at the middle portion of the rear end member easily and with a simple structure.

According to another embodiment of the present invention, an upper ridgeline of a border of the upper portion and the step portion and a lower ridgeline of a border of the lower portion and the step portion are configured such that a distance therebetween becomes narrow toward a direction apart from the opening in the vehicle width direction. Thereby, since the rear end member does not have any portion where the stress is concentrated, the opening which opens upward can be formed at the rear end member, ensuring the rigidity of a rear end portion.

According to another embodiment of the present invention, the rear vehicle-body structure of a vehicle further comprises a rear end panel which is provided behind the rear end member to form a closed cross section extending in the vehicle width direction cooperatively with the rear end member, wherein the attachment portion is formed integrally with the rear end trim so as to extend rearward and downward in a hook shape, and the rear end panel has a protrusion portion protruding rearward at a position which corresponds to the attachment portion of the rear end trim. Thereby, any interference of a tip of the attachment portion with the rear end panel can be prevented, so that the attachment portion can be prevented from being damaged and also the attaching of the rear end trim can be improved.

Other features, aspects, and advantages of the present invention will become apparent from the following description which refers to the accompanying drawings.

DETAILED DESCRIPTION OF THE INVENTION

Hereafter, the present invention will be described referring to a preferred embodiment. In the drawings, an arrow F shows a forward direction of a vehicle body, and an arrow L shows a left-side direction of the vehicle body.

Hereafter, the present embodiment will be described referring to FIGS. 1-11. In the present embodiment, a 5-door hatch back type of vehicle V, in which an opening of a baggage compartment at a rear portion of the vehicle body is closable with a lift gate (not illustrated), will be described as an example. As shown in FIGS. 1-5, the rear portion of the vehicle V comprises a floor panel 1, a rear end portion 2, a rear end trim 3 which covers a surface of the rear end portion 2, and so on.

Figure 1:
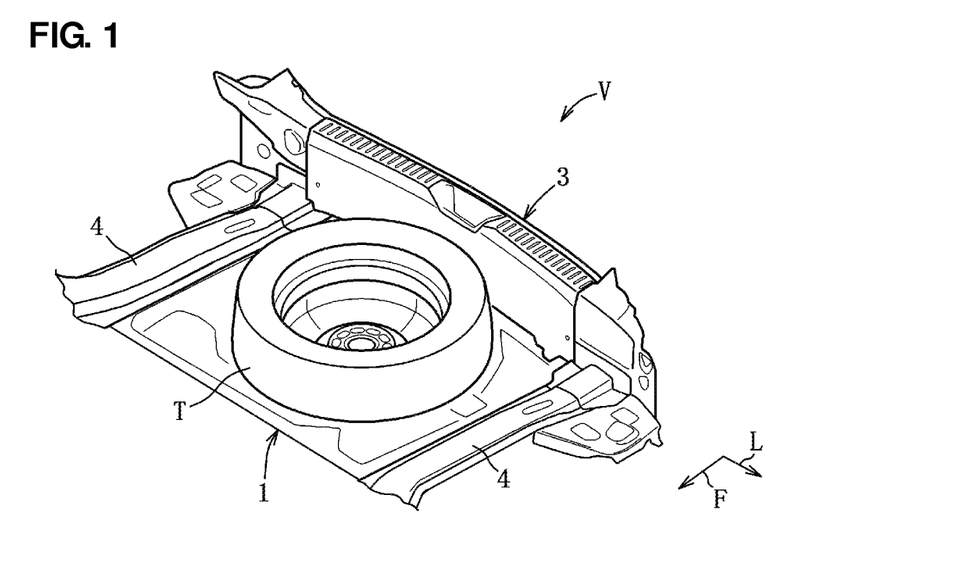
FIG. 1 is a perspective view of a rear vehicle-body structure of a vehicle according to an embodiment of the present invention.
Figure 2:
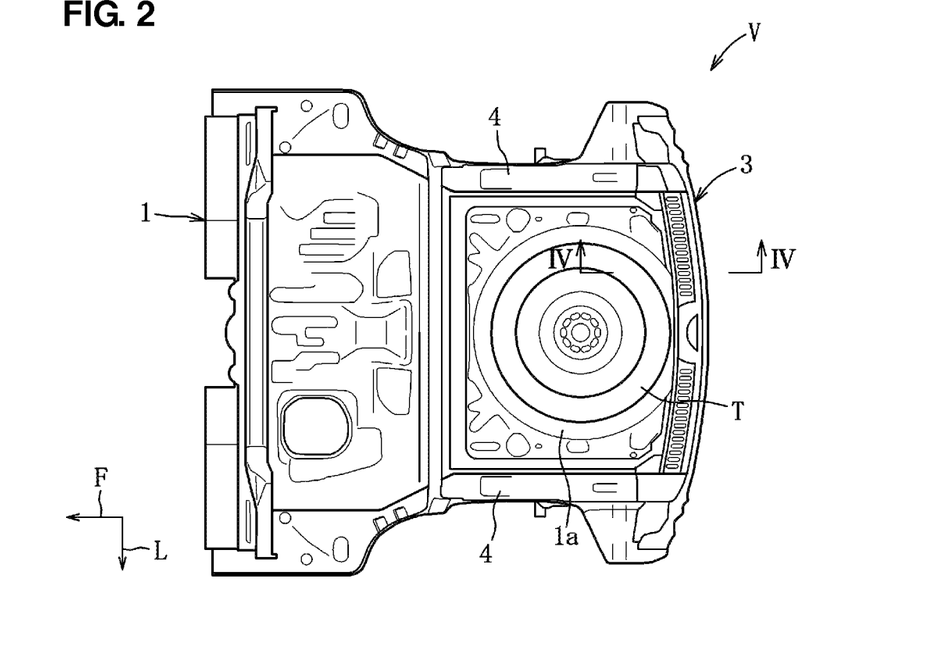
FIG. 2 is a plan view of the rear vehicle-body structure.

As shown in FIGS. 1 and 2, the floor panel 1 is provided between a pair of right-and-left rear side frames 4, which forms a floor portion of a baggage compartment S. The baggage compartment S is partitioned by a pair of right-and-left side panel inners (not illustrated) which is provided in back of a rear seat (not illustrated) and in front of the rear end portion 2 and the lift gate. The floor panel 1 has a spare tire pan 1a for storing a spare tire T, which is formed at a position of the floor panel 1 which is located at the center in a vehicle width direction and at a rear side in a longitudinal direction. The spare tire pan 1a is configured to be concave downward from the floor panel 1.

In the present embodiment, the concave depth of the spare tire pan 1a is designed to be as shallow as possible so that the aerodynamic characteristics of the vehicle V can be improved. Accordingly, the spare tire T in a storage state projects toward the inside of the baggage compartment S from the spare tire pan 1a, so that a baggage-compartment board 5 which forms a floor face of the baggage compartment S is placed onto the spare tire T. Herein, while a normal tire is used as the spare tire T in the present embodiment, a temper tire for emergency may be applied instead.

Next, the rear end portion 2 will be described. As shown in FIGS. 3-11, the rear end portion 2 is connected to a rear end of the floor panel 1, and has a closed cross section which extends in the vehicle width direction to increase the torsional rigidity of the vehicle body. The rear end portion 2 comprises a rear end member 10 which extends in the vehicle width direction, a rear end panel 20 which is provided behind the rear end member 10 and extends in the vehicle width direction, and so on. Herein, the rear end portion 2 is symmetrical, so its right-side part will be described primarily.

As shown in FIGS. 4-10, the rear end member 10 is formed integrally by means of pressing of a long metal plate, and comprises an upper portion 11, a lower portion 12, a pair of right-and-left step portions 13, a pair of right-and-left openings 14, and so on. The upper portion 11 comprises an upper flange portion 11a which slants rearward and upward, a front vertical wall portion 11b which extends substantially vertically, an upper wall portion 11c which connects a lower end of the upper flange portion 11a and an upper end of the front vertical wall portion 11b and extends substantially horizontally, and so on. At the upper wall portion 11c are formed a latch attachment portion 15 which is provided at a central portion in the vehicle width direction, a pair of right-and-left inside support portions 16, a pair of right-and-left middle support portions 17, and a pair of right-and-left outside support portions 18.

Figure 6:
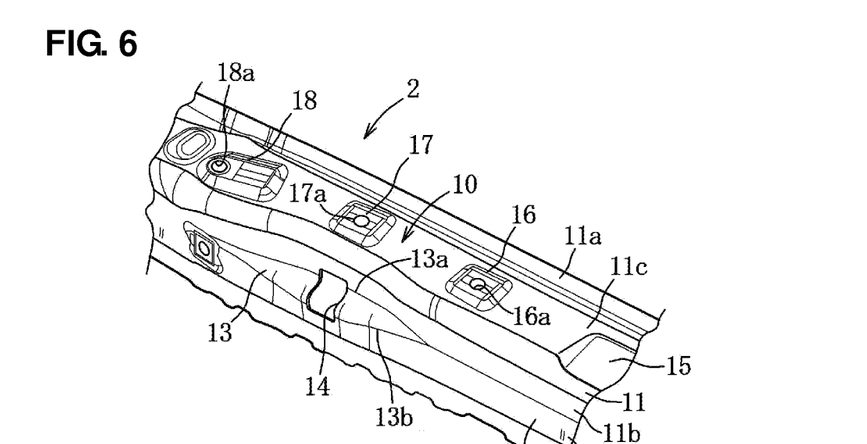
FIG. 6 is a perspective view of a major part of a rear end portion without a rear end trim.
Figure 7:
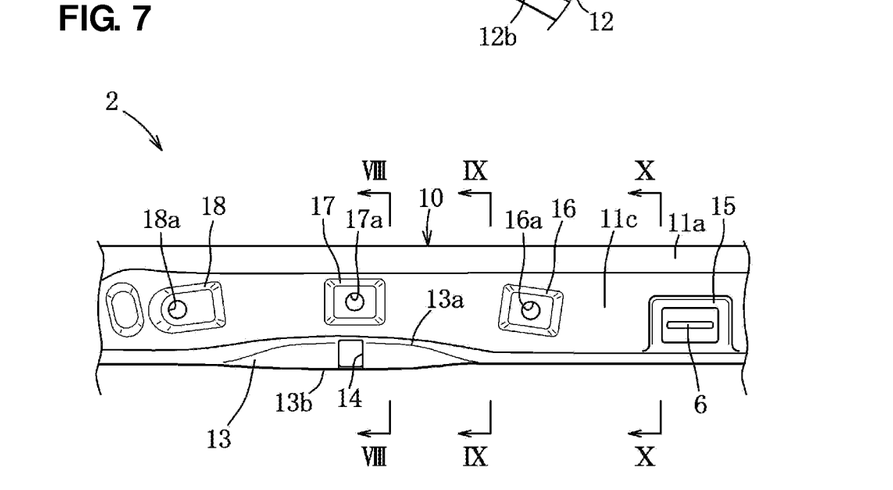
FIG. 7 is a plan view of FIG. 6.
Figure 9:
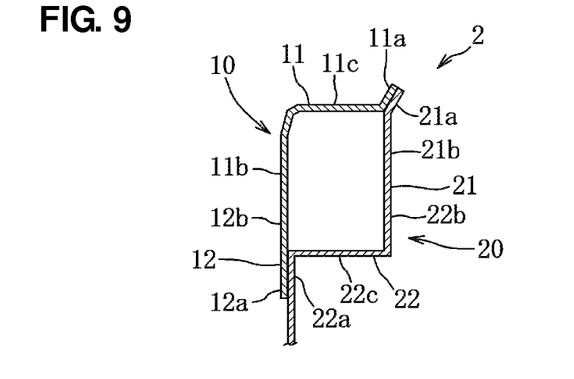
FIG. 9 is a sectional view taken along line IX-IX of FIG. 7.

As shown in FIGS. 6, 7 and 9, the latch attachment portion 15 is provided with a latch 6 which is operative to engage with a striker (not illustrated) provided at a lower end of the lift gate. The latch attachment portion 15 is formed at a front end portion of the upper wall portion 11c such that it slants forward and downward. The inside support portion 16 is arranged on the outward side, in the vehicle width direction, of the latch attachment portion 15, and formed such that it projects upward from the upper wall portion 11c. The inside support portion 16 is operative to support the rear end trim 3 via a clip 33 which is formed integrally with the rear end trim 3, conducting laterally and vertically positioning of the rear end trim 3.

The middle support portion 17 is arranged on the outward side, in the vehicle width direction, of the inside support portion 16, and formed such that it projects upward from the upper wall portion 11c. The middle support portion 17 is, similarly to the inside support portion 16, operative to support the rear end trim 3 via the clip 33 which is formed integrally with the rear end trim 3, conducting laterally and vertically positioning of the rear end trim 3. The outside support portion 18 is arranged on the outward side, in the vehicle width direction, of the middle support portion 17, and formed such that it projects upward from the upper wall portion 11c. The outside support portion 18 is, similarly to the middle support portion 17, operative to support the rear end trim 3 via the clip 33 which is formed integrally with the rear end trim 3, conducting laterally and vertically positioning the rear end trim 3.

As shown in FIGS. 6 and 7, clip holes 16a, 17a, 18a which vertically penetrate the upper wall portion 11c are respectively formed at the above-described six support portions 16, 17, 18. In the present embodiment, the distance between the latch attachment portion 15 and the inside support portion 16 is configured to be substantially equal to the distance between the inside support portion 16 and the middle support portion 17 as well as the distance between the middle support portion 17 and the outside support portion 18. The lower portion 12 is continuous downward from the upper portion 11, and comprises a lower flange portion 12a which extends substantially vertically, a front vertical wall portion 12b which extends substantially vertically and continuously from the lower flange portion 12a, and so on.

The pair of right-and-left step portions 13 is respectively arranged at middle positions, in the vehicle with direction, between the central portion and the right-and-left end portions of the rear end member 10, which corresponds to the pair of right-and-left middle support portions 17. The step portion 13 constitutes a connection portion which connects an upper end of a portion of the lower portion 12 which partially projects forward and a lower end of the upper portion 11. The step portion 13 substantially slants forward and downward, and forms an upper ridgeline 13a at a border of the upper portion 11 and the step portion 13 and a lower ridgeline 13b at a border of the lower portion 12 and the step portion 13. The curve-shaped upper and lower ridgelines 13a, 13b are of a diamond shape in a plan view.

As shown in FIGS. 6 and 7, a rectangular opening 14 is formed at a central portion, in the vehicle width direction, of the step portion 13, which penetrates the step portion 13 from forward above to rearward below. The opening 14 is formed at a middle portion of the rear end member 10 at a position corresponding to the middle support portion 17 such that it includes an upper-side top portion of the upper ridgeline 13a and a lower-side top portion of the lower ridgeline 13b. Accordingly, the opening 14 constitutes a rectangular opening in an elevational view as well as in a plan view.

Figure 8:
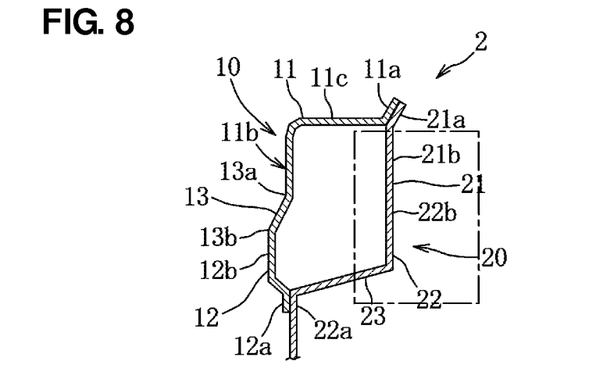
FIG. 8 is a sectional view taken along line VIII-VIII of FIG. 7.
Figure 10:
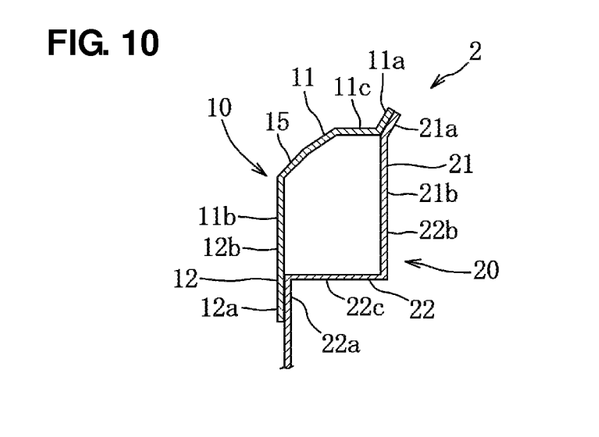
FIG. 10 is a sectional view taken along line X-X of FIG. 7.

The rear end panel 20 is formed integrally by means of pressing of a long metal plate, and comprises an upper portion 21, a lower portion 22, a pair of right-and-left protrusion portions 23, and so on. As shown in FIGS. 8-10, the upper portion 21 comprises an upper flange portion 21a which slants rearward and upward and a rear vertical wall portion 21b which extends substantially vertically. The upper flange portion 21a is connected to the upper flange portion 11a by means of spot welding.

The lower portion 22 is continuous downward from the upper portion 21, and comprises a lower flange portion 22a which extends substantially vertically, a rear vertical wall portion 22b which extends substantially vertically, a lower wall portion 22c which connects a lower end of the rear vertical wall portion 22b and an upper end of the lower flange portion 22a and extends substantially horizontally, and so on. The lower flange portion 22a is connected to the lower flange portion 12a by means of spot welding.

Figure 3:
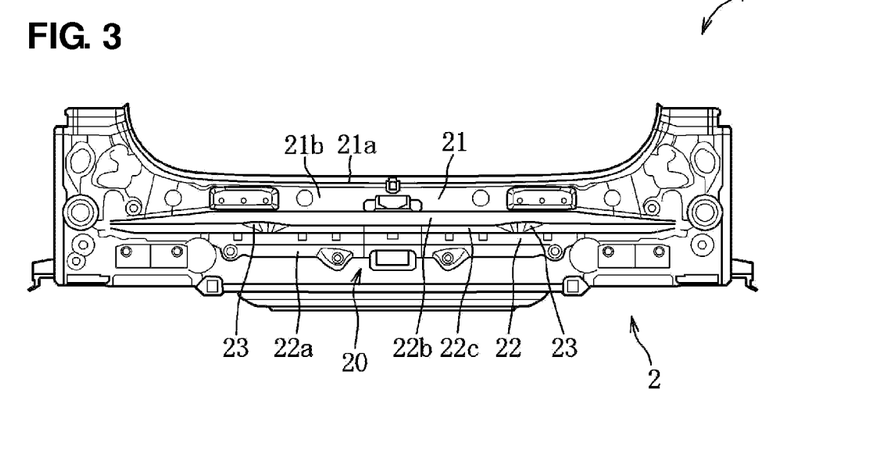
FIG. 3 is a view of the rear vehicle-body structure, when viewed from the rear

As shown in FIG. 3, the pair of right-and-left protrusion portions 23 is respectively arranged at middle positions, in the vehicle with direction, between the central portion and the right-and-left end portions of the rear end member 20, which corresponds to the pair of right-and-left openings 14. As shown in FIG. 7, the protrusion portion 23 is configured to protrude partially rearward and downward from the lower wall portion 22c, and connects the rear vertical wall portion 22b and an upper end of the lower flange portion 22a such that it slants rearward and upward. The width, in the vehicle width direction, of the protrusion portion 23 is configured to be substantially equal to, or slightly larger than that of the opening 14, and smaller than that of the step portion 13.

As described above, the rear end portion 2 basically has the rectangular closed cross section (see FIG. 9), and its central portion forms a pentagon closed cross section (see FIG. 10) and its right-and-left sides form a heptagon closed cross section (see FIG. 8). Therefore, the closed cross section which continuously extends in the vehicle width direction is formed at the rear end portion 2, thereby improving the torsional rigidity.

Figure 4:
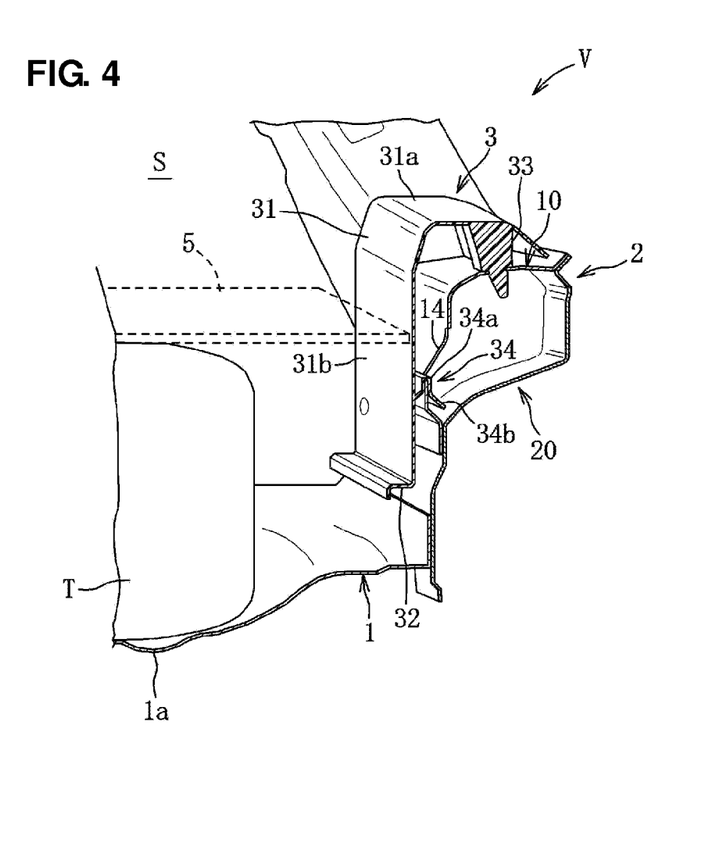
FIG. 4 is a sectional view taken along line IV-IV of FIG. 2.
Figure 5:
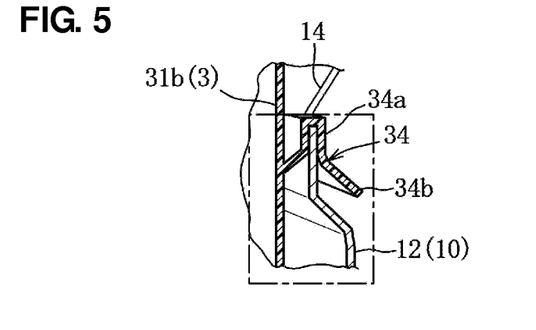
FIG. 5 is an enlarged view of a major part of FIG. 4.
Figure 11:
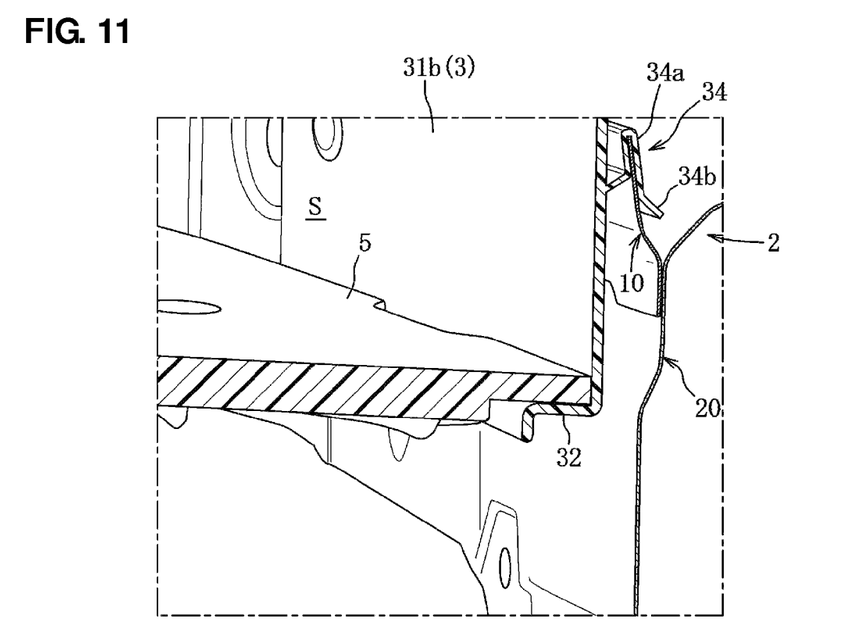
FIG. 11 is a sectional view without a spare tire, which corresponds to FIG. 4.

Next, the rear end trim 3 will be described. As shown in FIGS. 4, 5 and 11, the rear end trim 3 is made from synthetic resin and formed integrally, and comprises a trim body portion 31 which covers a front surface of the rear end member 10, a board support portion 32, and so on. The trim body portion 31 integrally comprises an upper body portion 31a which covers over the upper wall portion 11c, a lower body portion 31b which covers the front vertical wall portions 11b, 12b from the front, the six clips 33, a pair of right-and-left attachment portions 34, and so on.

The upper body portion 31a has substantially a U-shaped cross section, and its central portion has a rectangular opening (not illustrated) at a position which corresponds to the latch attachment portion 15. The six clips 33 which extend downward are formed at positions of a lower back face portion of the upper body portion 31a which respectively correspond to the six clip holes 16a, 17a, 18a. When the rear end trim 3 is attached to the rear end member 10 by inserting the clips 33 into the clip holes 16a, 17a, 18a, respective small-diameter tips of the clips 33 engage with these clips holes, whereby the longitudinally and laterally poisoning of the rear end trim 3 can be conducted. Likewise, respective large-diameter middle portions of the clips 33 are supported at the support portions 16, 17, 18, whereby the vertically positioning of the rear end trim 3 can be conducted. The lower body portion 31b is configured to extend vertically downward from a front lower end of the upper body portion 31a to the vicinity of the floor panel 1.

At a middle portion of the rear back face of the lower body portion 31b are provided a pair of right-and-left attachment portions 34 at respective positions which correspond to the pair of right-and-left protrusion portions 23 of the rear end trim 3 attached. As shown in FIG. 5, the attachment portion 34 is configured to conduct longitudinally and vertically positioning of the rear end trim 3 through its engaging with the front vertical wall portion 12b. This attachment portion 34 includes an attachment body portion 34a and a leg portion 34b, and is formed in a hook shape. The attachment body portion 34a is formed in a U shape which opens downward. The leg portion 34b is configured such that it extends rearward and downward substantially straightly from a rear lower end of the attachment body portion 34a.

When the rear end trim 3 is moved down vertically from above the step portion 13 (the opening 14), the leg portion 34b is guided from a contact point of the leg portion 34b with the front vertical wall portion 12b toward an upper end of the front vertical wall portion 12b. Thereby, the positioning of the attachment portion 34 relative to the opening 14 is conducted according to the moving down of the rear end trim 3. Further, when the rear end trim 3 is attached to the rear end member 10, the attachment body portion 34a is placed on the upper end of the front vertical wall portion 12b with the front vertical wall portion 12b located between front and rear faces thereof. Thereby, the longitudinally and vertically positioning of the rear end trim 3 is conducted. The leg portion 34b is arranged apart from the protrusion portion 23 with a specified distance.

As shown in FIG. 11, the board support portion 32 supports a rear end of the baggage-compartment board 5 when the spare tire T is not installed. The board support portion 32 is configured in an L shape such that it extends substantially horizontally forward from a lower end of the lower body portion 31b. Therefore, the level of the baggage-compartment board 5 at the time of the spare tire T being not installed is set to be lower than that of the baggage-compartment board 5 at the time of the spare tire T being installed, so that the storage space of the baggage compartment S is properly increased.

Next, the operations and effects of the rear vehicle-body structure of a vehicle according to the present embodiment will be described. According to the present rear vehicle-body structure of a vehicle, since the space for attaching the rear end trim 3 is ensured above the rear end member 10 and the attachment portion 34 configured to be inserted into the opening 14 of the rear end member 3 is provided at the rear end trim 3, the rear end trim 3 can be effectively fixed to the rear end member 10 from right above vertically, without receiving any improper influence of articles loaded in front of the rear end member 10 in the baggage compartment.

The rear end member 10 has the step portion 13 which is formed at the connection portion connecting the upper portion 11 and the lower portion 21 which is positioned in front of and below the upper portion 11, and the opening 14 is formed at the step portion 13. Thereby, the opening 14 which opens upward can be formed at the middle portion of the rear end member 10 easily and with a simple structure.

The upper ridgeline 13a of the border of the upper portion 11 and the step portion 13 and the lower ridgeline 13b of the border of the lower portion 12 and the step portion 13 are configured such that the distance therebetween becomes narrow toward the direction apart from the opening 14 in the vehicle width direction. Thereby, since the rear end member 10 does not have any portion where the stress is concentrated, the opening 14 which opens upward can be formed at the rear end member 10, ensuring the rigidity of the rear end portion 2.

The rear end panel 20 is provided behind the rear end member 10 to form the closed cross section extending in the vehicle width direction cooperatively with the rear end member 10, the attachment portion 34 is formed integrally with the rear end trim 3 so as to extend rearward and downward in the hook shape, and the rear end panel 20 has the protrusion portion 23 protruding rearward at the position which corresponds to the attachment portion 34 of the rear end trim 3. Thereby, any interference of the tip of the attachment portion 34 with rear end panel 10 can be prevented, so that the attachment portion 34 can be prevented from being damaged and also the attaching of the rear end trim 3 can be improved.

The present invention should not be limited to the above-described embodiment, and any other modifications or improvements may be applied within the scope of a sprit of the present invention.

For example, while the above-described embodiment shows the example in which the spare tire pan is configured such that its depth is shallower than the thickness of the spare tire, the depth of the spare tire pan may be so deep that the spare tire can be stored completely in the spare tire pan. Even in this case, since there occurs a situation where some articles loaded in the baggage compartment, such as a jack, is located in the area in front of the opening of the rear end member, the above-described effects can be provided.

Further, while the above-described embodiment shows the example in which the step portion is configured to slant forward and downward, the step portion may be configured to extend substantially horizontally as long as it connects the lower end of the upper portion and the upper end of the lower portion of the rear end member. In this case, the above-described effects can be provided as well. Moreover, while a pair of right-and-left openings is provided at the rear end member in the above-described embodiment, a single opening or three or more openings may be provided.

Additionally, the above-described embodiment is applied to the 5-door hatch back type of vehicle, the present invention is applicable to any type of vehicle as long as it has a baggage compartment.

What is claimed is:

1. A rear vehicle-body structure of a vehicle, comprising:
a floor panel;
a rear end member provided at a rear portion of the floor panel and extending in a vehicle width direction; and
a rear end trim covering a surface on a baggage-compartment side of the rear end member,
wherein a loading space of baggage is formed in front of said rear end trim, said rear end member has an opening which opens upward at a middle portion thereof, and said rear end trim has an attachment portion, by which the rear end trim is attachable to the rear end member, the attachment portion being configured to be inserted from above into said opening of the rear end member for engagement between the attachment portion and the opening; and
wherein said rear end member has a step portion which is formed at a connection portion connecting an upper portion of the rear end member and a lower portion of the rear end member which is positioned in front of and below the upper portion, and said opening is formed at said step portion.

2. The rear vehicle-body structure of a vehicle of claim 1, wherein an upper ridgeline of a border of said upper portion and said step portion and a lower ridgeline of a border of said lower portion and the step portion are configured such that a distance therebetween becomes narrow toward a direction apart from the opening in the vehicle width direction.

3. The rear vehicle-body structure of a vehicle of claim 1, further comprising a rear end panel which is provided behind said rear end member to form a closed cross section extending in the vehicle width direction cooperatively with the rear end member, wherein said attachment portion is formed integrally with the rear end trim so as to extend rearward and downward in a hook shape, and said rear end panel has a protrusion portion protruding rearward at a position which corresponds to said attachment portion of the rear end trim.

4. The rear vehicle-body structure of a vehicle of claim 2, further comprising a rear end panel which is provided behind said rear end member to form a closed cross section extending in the vehicle width direction cooperatively with the rear end member, wherein said attachment portion is formed integrally with the rear end trim so as to extend rearward and downward in a hook shape, and said rear end panel has a protrusion portion protruding rearward at a position which corresponds to said attachment portion of the rear end trim.

5. A rear vehicle-body structure of a vehicle, comprising:
a floor panel;
a rear end member provided at a rear portion of the floor panel and extending in a vehicle width direction;
a rear end trim covering a surface on a baggage-compartment side of the rear end member, and
a rear end panel which is provided behind said rear end member to form a closed cross section extending in the vehicle width direction cooperatively with the rear end member, wherein a loading space of baggage is formed in front of said rear end trim, said rear end member has an opening which opens upward at a middle portion thereof, and said rear end trim has an attachment portion, by which the rear end trim is attachable to the rear end member, the attachment portion being configured to be inserted from above into said opening of the rear end member for engagement between the attachment portion and the opening; and wherein said attachment portion is formed integrally with the rear end trim so as to extend rearward and downward in a hook shape, and said rear end panel has a protrusion portion protruding rearward at a position which corresponds to said attachment portion of the rear end trim.

\* \* \* \* \*